3,244,541
WATER-REPELLENT COMPOSITIONS AND METHODS OF MAKING SAME

Jacob M. Fain, Edward McDonnell, and Robert Blaufox, Brooklyn, N.Y., assignors, by mesne assignments, to The 29 West Fifteenth Street Corporation, New York, N.Y., a corporation of New York
No Drawing. Filed Feb. 3, 1961, Ser. No. 86,845
13 Claims. (Cl. 106—13)

The invention relates to water-repellent compositions and the method of forming transparent water-repellent films on the surface of glass or other transparent solids.

The maintenance of clear vision through windshields when they are subjected to rain or a water spray has been a problem for a long time. Visibility is impaired by rain or water spray impinging on the windshields. Mechanical wipers have been used with considerable success on windshields of automobiles, locomotives, boats and planes. However, mechanical wipers are often impractical for today's high speed aircraft, particularly jet aircraft, due to the rapid flow of air over the windshield.

Attempts have been made to render the outer surface of the windshields non-wettable by water so the water will break up into tiny droplets which will be blown off by the wind stream passing over the windshield surface. Various coatings and application methods to render the transparent solids non-wettable have been tried. However, the prior art coatings have failed in meeting all the severe requirements and have some disadvantages.

The more important requirements for such coatings are:
 (a) The coating must be optically clear;
 (b) The coating must adhere strongly to the surface;
 (c) The water must be shed from the coating in droplets of a size which will not interfere with vision;
 (d) The material must be suitable for application to the cleaned glass of pilot's enclosures and must maintain satisfactory visibility through the glass during varying rain conditions;
 (e) The applied material must not produce an objectionable glare under varying conditions of light intensity;
 (f) The rain repellent must not have adverse effects on the materials used in aircraft construction; such as aluminum, aluminum alloys, magnesium alloys, titanium, ferrous alloys, copper alloys, aircraft finishes, glass, etc.;
 (g) In view of the fact that the material is spread in thin films, the rain repellent is required to have suitable characteristics both in volume and when spread in thin films;
 (h) The material must not be excessively high in cost;
 (i) The material must be non-inflammable after application and it should have as high a flash point as possible prior to application;
 (j) The material must be low in toxicity, and it should not constitute a medical hazard to personnel or produce obnoxious vapors;
 (k) The material must have good storage stability in the container; it should not deteriorate in the container under normal storage conditions in the temperature range of 32° F. to 160° F.;
 (l) The material after application must not pick up excessive dust or lightweight particles;
 (m) The material must be capable of being applied to the glass easily;
 (n) The material must possess the ability to withstand a temperature of 300° F. minimum;
 (o) The material must be resistant to the common chemical compounds used in aircraft, particularly jet engine fuels.

Many different type films have been tried by the prior art and the most successful prior to applicants' invention have been various films containing organic silicon compounds. However, all of the prior art films have failed in one or more of the essential requirements listed above.

Silicone and silicone-wax combinations have been used as aircraft rain repellents. U.S. Patent No. 2,612,458 (Stedman) discloses rain repellents consisting of substituted polysilicanes having at least 1 Si—Si linkage and containing only carbon, hydrogen and silicon. Such compounds are applied to a windshield by hard rubbing. The film deposited on the glass is not satisfactory as the film is not sufficiently repellent at the high speeds encountered by aircraft and a more repellent wax composition must be applied over it to obtain a useful product.

U.S. Patent No. 2,923,653 (Stedman) describes an improved composition which is achieved by substituting alkoxy groups for some of the alkyl groups in the polysilicane. These alkoxy groups being somewhat reactive are caused to condense when rubbed on the glass surface. This makes it possible to provide a repellent surface with these films alone and unnecessary to apply a wax overcoating. However, the coating from either composition is not satisfactory as the windshield must be rubbed hard and for a long period of time to apply the film.

U.S. Patent No. 2,962,390 (Fain et al.) describes a silane-wax system. This discloses a paste containing a solid rubbing agent and an alkyl alkoxy silane such as amyl triethoxysilane. When the paste is rubbed on a glass surface, some hydrolysis and condensation of the silane occurs, and a film of amyl polysiloxane is deposited on the glass. This forms a suitable surface on which a more repellent wax film may be deposited. These systems have been found to have relatively great ease of application. Their poor resistance to jet fuel contamination, and inadequate thermal stability at the temperatures encountered in high speed jet flight, however, make them deficient for use on high speed jet aircraft.

It is also known that exposure of various materials to vapors of di- and tri-functional methylchlorosilanes results in the deposition of a stable water-repellent layer on the surface. The water-repellent treatment consists of rapidly reacting methylchlorosilane vapors with surface hydroxyl groups or water adsorbed on the surface of the material to be coated and in this manner depositing a thin film of methylpolysiloxane on the surface. The reaction is found to occur with cotton cloth, paper, wood, and in a less pronounced way with wool, silk, leather, and many other materials.

Methylchlorosilane vapors also react readily with glass and other ceramic surfaces to give very effective water-repellent films, but only if the surface has an adsorbed film of water on it. Completely dry glass, baked under vacuum, does not become distinctly water-repellent upon treatment. Glass which has stood at atmospheric conditions usually has on its surface a film of water up to 100 molecules thick, the actual thickness depending on the relative humidity of the surrounding air. The experimental facts indicate a rapid hydrolytic reaction of the methylchlorosilane vapors at the surface of the object being treated. Insofar as the end result is concerned, it does not matter whether the reaction is one with adsorbed water or with hydroxyl groups in a structure like that of cellulose which are capable of reacting. The important point is that the polysiloxane film appears to be chemically bonded to the substrate probably through oxygen, and it can be removed only by strong chemical action or severe abrasion.

The application of methylchlorosilane vapor to aircraft windshields renders them water-repellent so that the high speed air stream easily removes rain and promotes good vision. A method has been developed for applying methylchlorosilane vapors to aircraft windshields. The film exhibits excellent rain repellency, abrasion and heat resistance. The serious disadvantages are that the material is toxic and corrosive in bulk and requires an elaborate and time-consuming application procedure. The windshield is covered with a vapor-tight protective hood, an open container of methylchlorosilane is placed in the hood, and the vapors are allowed to condense on the clean windshield for 30 to 60 minutes. The entire operation including set up, clean up, etc., requires up to 2 hours to complete. These disadvantages prohibit the use of the vapor treatment as a regular field or flight line operation.

It is an object of the invention to obtain a water-repellent composition easily applied to surfaces of transparent solids.

It is a further object of the invention to obtain windshields with water-repellent outer surfaces which are satisfactory for use in jet aircraft.

It is another object of the invention to provide a simple method for the application of water-repellent compositions to the surfaces of transparent solids.

These and other objects and advantages of the invention will become obvious from the following detailed description.

The compositions of the invention comprise solutions of an acid in alkyl alkoxy silanes which, when applied to a transparent surface, appear to react chemically with the transparent surface. A durable water-repellent film which fulfills all the requirements listed above is formed on the surface of the transparent solid. The films are easy to apply, have excellent rain-repellency, are resistant to weathering and contamination by jet aircraft fuel, and are thermally stable. Treatment of a film of the alkyl alkoxy silanes on a transparent surface with the vapors of certain acids will also produce a durable, water-repellent coating.

The alkyl alkoxy silanes useful in the compositions of the invention are selected from the group consisting of

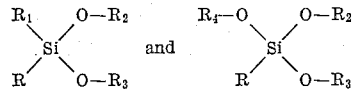

wherein $R$ and $R_1$ are alkyl radicals having 1 to 18 carbon atoms, and $R_2$, $R_3$ and $R_4$ are alkyl radicals having 1 to 7 carbon atoms. Examples of suitable alkyl alkoxy silanes are amyl triethoxy silane, octadecyl triethoxy silane, ethyl triethoxy silane, and dimethyl diethoxy silane.

The acids dissolved in the alkyl alkoxy silanes may be organic or inorganic acids and should not contain large amounts of water. Suitable acids are sulfuric acid, paratoluene sulfonic acid, phosphorus pentoxide, and trichloroacetic acid. Suitable acid vapors for the treatment of films of the alkyl alkoxysilanes are those of hydrochloric acid, hydrobromic acid, and nitric acid.

The acid may be added to the compositions as the free acid or it may be produced in situ. For example, small amounts up to 10% by weight of dimethyl dichloro silane or methyl trichloro silane can be added to the alkyl alkoxy silane, and when the composition is applied to the surface of the transparent solid, the chlorinated silane will be hydrolyzed by the water on said surface and form hydrogen chloride.

The amount of acid present in the composition is limited by its solubility in the alkyl alkoxy silane, and the solubility will vary according to the particular acid and the alkyl alkoxy silane used. For example, the solubility limit of 96% sulfuric acid in dimethyl diethoxy silane at room temperature is less than 1% by volume. Compositions of dimethyl diethoxy silane containing 0.1% sulfuric acid by volume give adequate rain-repellent films which have good resistance to jet fuel contamination. If the composition of dimethyl diethoxy silane contains less than 0.1% sulfuric acid, films with poorer rain spray resistance and poorer jet fuel resistance are obtained. Compositions of dimethyl diethoxy silane having 0.75% sulfuric acid darken slightly but show no separation of acid or silicone oil on standing at room temperature as compositions containing 1.0% sulfuric acid do. Films having excellent repellency are formed from compositions of dimethyl diethoxy silane containing 0.75 to 1.0% sulfuric acid but they are slightly greasy. Ideal films are formed by a composition comprising dimethyl diethoxy silane and 0.1% to 0.75% by volume, preferably 0.2 to 0.25%, of 96% sulfuric acid. Trichloro acetic acid is more soluble and can be present in high concentrations.

While the invention is not intended to be limited by any theory, it is believed that the alkyl alkoxy silane reacts with the acid to form an intermediate compound which is easily hydrolyzed to form an alkyl polysiloxane bonded to the transparent solid. For example, it is believed that in a composition of sulfuric acid in dimethyl diethoxy silane, intermediates are formed such as dimethyl silyl bisulfate or dimethyl silyl sulfate which are hydrolyzed to the alkyl polysiloxane. Although this is believed to be what takes place in the formation of the films of this invention, it is not intended to limit the scope of the invention to this theory.

The compositions of the invention may be applied in many ways. Wiping a clean transparent surface with a tissue or cloth moistened with the acidified silane and polishing the surface with a dry tissue or cloth to remove any excess of the composition gives a satisfactory film on the surface. The film can also be applied by spraying the acidified silane on the transparent surface with a spray gun or atomizer, or by spraying from an aerosol bomb, since the acidified silanes are miscible with fluorinated hydrocarbon propellants and aliphatic and chlorinated aliphatic solvents. The films can also be applied by applying the unacidified alkyl alkoxy silane to the surface of the transparent solid and then wiping with a cloth pad impregnated with or containing an acid salt such as sodium bisulfate, aluminum chloride or mixtures of sodium bisulfate and sodium halides.

In addition to the use of the compositions of the invention as a water-repellent for windshields and surfaces of other transparent solids, such as optical lenses which come into contact with water such as lenses in periscopes and binoculars, they may be used to replace methyl chlorsilane in various treatments. Glass tumblers may be coated to make them easier to wash and dry. Vitreous enamel may be coated to prevent stains and to give it an improved luster. Ceramic parts for electrical applications and minerals in ore flotation processes may also be treated.

In the following example there is described several preferred embodiments to illustrate the invention. However, it should be understood that the invention is not intended to be limited to the specific embodiment.

EXAMPLE

To 99.46 grams of dimethyl diethoxy silane there was added 0.54 gram of 96% sulfuric acid with stirring to form a solution of dimethyl diethoxy silane containing 0.25% by volume of sulfuric acid. The solution was thoroughly stirred to insure complete solution of the sulfuric acid in the dimethyl diethoxy silane and was then packaged in glass bottles with plastic caps. During the preparation and packaging, the solution was protected from atmospheric moisture to prevent hydrolysis and polymerization. The solution could be stored for extended periods of time under these conditions without adverse effects.

Upon applying the said composition to a glass surface, there was immediately obtained a durable, water-repellent film. No curing or other treatment was necessary. The film was colorless and completely transparent. After exposing the treated surface to outdoor weathering for four weeks, there was still good rain repellence. Exposure of the treated surface to jet fuel produced no noticeable impairment of the rain spray resistance. No tendency for the treated glass surface to pick up more dust than that deposited on an untreated glass surface could be observed.

Various modifications of the compositions and methods of the invention may be made without departing from the spirit or scope thereof, and it is to be understood that the invention is to be limited only as defined in the appended claims.

We claim:
1. A composition capable of forming transparent, water-repellent films consisting of an alkyl alkoxy silane selected from the group consisting of

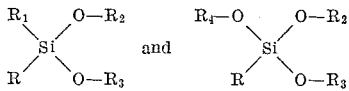

wherein R and $R_1$ are alkyl radicals having 1 to 18 carbon atoms, and $R_2$ and $R_3$ and $R_4$ are alkyl radicals having 1 to 7 carbon atoms having about 0.1 to 1.0% by volume of an acid dissolved therein.

2. The composition of claim 1, wherein the acid is sulfuric acid and is present in 0.1% to 0.75% by volume in the solution.

3. The composition of claim 1, wherein the alkyl alkoxy silane is dimethyl diethoxy silane.

4. The composition of claim 1, wherein the alkyl alkoxy silane is amyl triethoxy silane.

5. The composition of claim 1, wherein the alkyl alkoxy silane is octadecyl triethoxy silane.

6. A composition capable of forming transparent, water-repellent films consisting of a solution of 0.1 to 0.75% by volume sulfuric acid in dimethyl diethoxy silane.

7. The composition of claim 6, wherein the sulfuric acid is present in 0.2 to 0.25% by volume.

8. A method for forming a water-repellent film on the surface of a transparent solid which consists of applying to said surface a thin film of a solution of about 0.1% to 1.0% by volume of an acid in an alkyl alkoxy silane selected from the group consisting of

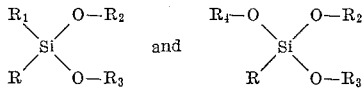

wherein R and $R_1$ are alkyl radicals having 1 to 18 carbon atoms and $R_2$, $R_3$ and $R_4$ are alkyl radicals having 1 to 7 carbon atoms.

9. The method of claim 8, wherein the alkyl alkoxy silane is dimethyl diethoxy silane.

10. A method for forming a water-repellent film on the surface of a transparent solid which consists of applying to said surface a thin film of an alkyl alkoxy silane selected from the group consisting of

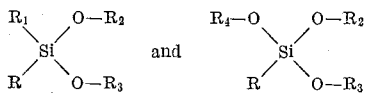

wherein R and $R_1$ are alkyl radicals having 1 to 18 carbon atoms and $R_2$, $R_3$ and $R_4$ are alkyl radicals having 1 to 7 carbon atoms and rubbing said film with a compound selected from the group consisting of an acid and an acid salt.

11. The method of claim 10, wherein the alkyl alkoxy is dimethyl diethoxy silane.

12. A method for forming a water-repellent film on the surface of a transparent solid which consists of applying to said surface a mixture consisting of an alkyl alkoxy silane selected from the group consisting of

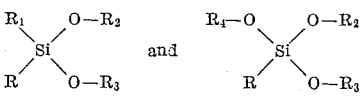

wherein R and $R_1$ are alkyl radicals having 1 to 18 carbon atoms and $R_2$, $R_3$ and $R_4$ are alkyl radicals containing 1 to 7 carbon atoms and up to 10% of an alkyl chlorosilane.

13. The process of claim 12 wherein the alkyl alkoxy silane is dimethyl dialkoxy silane.

References Cited by the Examiner

UNITED STATES PATENTS

| | | | |
|---|---|---|---|
| 2,834,693 | 5/1958 | Jellinek | 106—287 |
| 2,962,390 | 11/1960 | Fain et al. | 106—13 |

OTHER REFERENCES

Leznov et al.: Chemical Abstracts, vol. 54, pp. 9731-2, 1960.

ROBERT F. WHITE, *Primary Examiner.*

JOSEPH REBOLD, LESLIE H. GASTON, ALEXANDER H. BRODMERKEL, MORRIS LIEBMAN,
*Examiners.*